United States Patent Office 2,903,362
Patented Sept. 8, 1959

2,903,362

METHOD OF TENDERING MEAT

Jack F. Beuk, Hinsdale, Alfred L. Savich and Paul A. Goeser, Chicago, and John M. Hogan, Oak Lawn, Ill., assignors to Swift & Company, Chicago, Ill., a corporation of Illinois No Drawing. Application December 21, 1954
Serial No. 476,832

13 Claims. (Cl. 99—107)

This invention, in general, relates to tenderized meat products and to a method for tenderizing meat. More specifically, the invention relates to proteolytic enzyme tenderized meat products wherein the enzymes are distributed in a uniform manner in the animal tissue and to a method utilizing the vascular system of the animal to distribute the enzymes.

Tenderness of meat is a quality highly desired by the consumer and as such is of great economic importance in the livestock and packing industry. Consumer demand for the quality of tenderness in meat has directly influenced the development of present day feeding and livestock management practices as well as processing and marketing procedures. In general, it may be said that although many factors have been found to influence tenderness, the procedures developed to date have not permitted its complete control or prediction.

It is customary, for instance, for livestock producers to resort to heavy grain feeding of meat animals for prolonged periods of time to produce high grade meat animals. The heavy feeding results in carcasses having large amounts of surface and visceral fat which are undesirable to the consumer. The effect of fattening upon tenderness, although generally favorable, is unpredictable. Similarly, the practice of selection and grading of animals by conformation, condition, age, sex and breed with payment of premium prices for animals having the established desired characteristics believed to be related to tenderness does not always result in a final product of the tenderness anticipated. Even the physical characteristics of the meat cuts such as marbling, grain and amount of connective tissue do not always follow a predictable pattern with regard to tenderness.

Present processing procedures to increase tenderness involve either the holding of carcasses or cuts under refrigeration for two to six weeks to enhance tenderness by autolysis of the meat proteins or the holding of meat at relatively elevated temperatures for two to three days under ultra-violet light to minimize surface contamination and spoilage. The end result of both processes is generally an improvement in tenderness with certain exceptions due to failure of response of individual carcasses for unknown reasons. The processes, at best, do not result in sufficient tenderization of tougher cuts of meat such as the chuck to permit their handling and cooking in the same manner as the traditionally more tender cuts such as loin. The processes also involve added cost for handling and holding and losses due to shrink and surface deterioration.

The injection of enzymes into the animal carcass or cuts thereof has been employed with some success in tenderizing meat products. However, several problems have been encountered in the commercial application of this process, the primary problem being a non-uniform tenderization due to non-uniform distribution of the proteolytic enzyme. The process, as practiced heretofore, involves the use of a pumping apparatus for distribution of the enzyme into and through the vascular system of the carcass after bleeding. The chief cause of non-uniform tenderization lies in the failure of the process to penetrate the finer capillaries and arterioles with the enzyme solution. In addition, the veins and arteries are often ruptured due to the pressure exerted by the pumping apparatus. Accordingly, the enzyme solution is concentrated mostly in the larger vessels or in the ruptured areas of the meat. The resulting product has over-tenderized or mushy spots with other portions of the meat having little or no tenderization due to insufficient distribution of the enzyme solution in the capillary beds of the muscle tissue. Furthermore, difficulties have been encountered by this post mortem enzyme injection of the carcass due to overtenderization of glandular tissues such as the liver and kidneys. The post mortem injection process was further difficult to apply in commercial practice in that the dose of enzyme had to be varied depending on the initial and unpredictable toughness of the carcass to be treated. Furthermore, the large volume of solution used resulted in an undesirably wet appearance of the treated meat.

It is therefore an object of this invention to provide a process for tenderization of meat whereby essentially uniform tenderization is achieved in any meat bearing animal regardless of grade, sex or weight by a substantially uniform procedure of enzyme treatment.

A further object is to provide a process for tenderization of meat whereby traditionally tough cuts of meat of a carcass are sufficiently tenderized so that they may be cooked and handled in the same manner as the more tender cuts without over-tenderizing the normally tender cuts of the carcass.

A further object is to provide a method for tenderization of meat whereby the present practice of heavy grain feeding for the purpose of producing more tender meat may be eliminated with resulting savings to the livestock producer in handling and feeding and to the meat packer by reduction of the problem of trimming and disposal of excess fat associated with heavy grain feeding.

Another object is to provide a method for proteolytic enzyme tenderization of meat or poultry characterized by uniform distribution of the enzyme throughout the vascular system of the meat.

A further object is to provide a method for proteolytic tenderization of meat without excessive digestion of glandular tissue of the animal.

Another object is to provide a method for proteolytic tenderization of meat wherein a holding period is unnecessary to accomplish tenderization, whereby disadvantages incidental to long term holding such as shrink, spoilage and deterioration in color and flavor of the meat are eliminated.

A further object is to provide a meat product containing a proteolytic enzyme and characterized by distribution of the enzyme throughout the vascular system including the venules, capillaries, and arterioles of the meat.

A still further object is to provide a meat product of the class consisting of beef, lamb, mutton, pork, and veal characterized by uniform distribution of the proteolytic enzyme throughout the entire vascular system.

Other objects will be apparent to one skilled in the art from the following detailed description.

In general, the present invention relates to an antemortem injection of proteolytic enzyme into the vascular system of animals, and the holding of the animal for a period of time to attain distribution of the enzyme throughout the vascular system before slaughter. This invention provides a method for producing tender meat regardless of variation in initial degree of toughness of the particular meat cut or carcass without over-tenderizing the normally more tender cuts of meat.

More specifically, the invention relates to the injection of dilute aqueous solutions of proteolytic enzymes into the vascular system of meat bearing animals prior to slaughter. The invention has application in the tenderization of poultry, lamb, mutton, beef, veal and pork. An amount of time is allowed to elapse between injection and slaughter to attain uniform vascular distribution of the enzyme throughout the muscle tissues of the animal. Thereafter, the animal is slaughtered and the blood drained by conventional procedures. The draining removes a large portion of the blood in the main veins and arteries and, therefore, prevents excessive concentration of the enzyme in these larger vessels. The maze of smaller vessels consisting of the venules, arterioles, and capillaries is drained only slightly, if at all, in the bleeding step and hence holds the blood containing the distributed enzyme in the meat. Thus, the meat has a substantially uniform distribution of enzymes therein.

A distinct advantage to the meat packer is the attainment of tenderization without a long holding period. It has been ascertained that meat which has been treated according to the process of this invention may be frozen immediately after slaughter. The qualities of tenderness of the cooked product are substantially the same as meat which has been processed according to this invention but held under refrigeration without freezing for several days.

The meat product resulting from the process of this invention is characterized by the uniform distribution of the enzyme in the animal tissue. Blood containing the enzyme is present in the venules, capillaries, arterioles, and largely as a film in the collapsed larger veins and arteries.

The enzymes most useful to tenderize meat fall within the grouping of proteolytic enzymes, i.e., those hydrolyzing proteins. Within this category are such enzymes as papain, bromelin, ficin, trypsin, pepsin, and cathepsin. Preferably, the enzyme is administered in dilute aqueous media. A concentration of approximately 5–10% has been found to be satisfactory for a reasonably fast injection. Lower concentrations of enzyme, though operative, unnecessarily prolong the time of treatment and delay slaughter. Higher concentrations may be used with the exercise of due care by reducing rate of injection.

In preparing the solution, the enzyme powder is taken up in glycerol and diluted with physiological saline (0.9% NaCl) of pH 7.1 to 7.5. However, glycerol and saline may be omitted without affecting the results. Insoluble materials are removed by centrifugation or filtration.

Slaughter may be carried out one to five minutes after completion of the injection. Generally, it is preferred to slaughter the animal within 30 minutes after injection although slightly longer periods are not detrimental to the attainment of tenderized meat. After a period of 24 hours, unless a large doze of enzyme is used, the tenderization effect is no longer apparent.

The choice of enzyme will depend largely on its cost and its proteolytic activity under the conditions of antemortem vascular injection. One of the major influencing factors is the pH of the blood and tissue prior to and after rigor. The pH blood in the live animal is about 7.4±0.2 with the pH after rigor varying between about 5.0 and 6.7 as extremes. The choice of the particular enzyme will, of course, depend on its stability and activity within this pH range or narrower ranges in the case of specific types of animals. We have found that papain, bromelin, trypsin, and ficin have good stability and activity under these conditions.

With high quality enzymes, 0.5 mg. of enzymes per pound of live weight of the animal provides an apparent change in tenderness of the meat product. The maximum dosage recommended, is as follows: papain, 20 mg.; bromelin, 60 mg.; trypsin, 60 mg.; ficin, 15 mg. These dosages are also based on an enzyme preparation of high quality in regard to activity of the enzyme. However, since it is well recognized in the art that enzymes of a given kind vary with the source and the method of isolation of the enzyme, these approximate figures are not conclusive for every enzyme preparation. It is recommended that each batch of enzymes be checked for activity before deciding upon the dosage to be administered.

On smaller animals such as the chicken, injection is made by means of a needle and hypodermic syringe usually into one of the exposed veins such as the humeral or preferably directly into the internal metatarsal vein to prevent loss of valuable meat portions from hemorrhage at the site of injection. On larger animals such as cattle, sheep and hogs, injection into the jugular vein is best accomplished by a needle, tube and gravity flow bottle. Injection may be accomplished directly into the heart or arteries, but we prefer injection into the veins because of ready accessability. The following examples illustrate applications of the invention and should not be construed as placing any limitations on the invention other than defined in the appended claims:

EXAMPLE I

Five ewes weighing 100–120 pounds and 2 to 3 years of age were injected with an aqueous solution of papain (5%). The solution was prepared by weighing out 5 grams of papain powder (NF), dispersing the powder in glycerol, and diluting with physiological saline (0.9 percent sodium chloride). The preparation was stirred for thirty minutes, adjusted to pH 7.2, centrifuged and filtered to remove insoluble material and diluted to 100 ml. with physiological saline.

Prior to injection, the circulation to the hind leg was cut off so as to prevent penetration of the enzyme solution and permit use of the meat from this leg as a control for determination of tenderization effected on the opposite leg. The surgical procedure followed in preparing the control leg was as follows:

The Paralumbar fossa was clipped and a local nerve block, using a commercial 2.5 percent solution of procaine, administered; an incision approximately 5 inches long was made through the wall into the abdominal cavity; the fascia and connective tissue around the external iliac and circumflex iliac arteries were torn down by digital manipulation and these arteries clamped with a large hemostat.

Injection was accomplished by means of a needle, tube and gravity flow bottle directly into the jugular vein. Volumes of solution (5 percent papain) equivalent to doses of 60, 45, 30, 17.5 and 15.0 mg. of papain per pound of live weight were administered to the different ewes. Injection times varied from 1 to 5 minutes and each of the animals was dispatched three minutes after completion of the injection, dressed and chilled for 24 hours.

The legs were then removed and roasted for tenderness panel tests. The results are reported below.

| Dose, mg. Papain/lb. live wt. | Test Leg | Control Leg |
| --- | --- | --- |
| 60 | 10 (mushy) | 5 |
| 45 | 10 (mushy) | 5 |
| 30 | 10 (mushy) | 7 |
| 17.5 | 9 | 6 |
| 15.0 | 9 | 6 |

EXAMPLE II

Two groups of six old roosters each weighing 7 to 8 pounds were injected with varying amounts of a 5 percent papain solution prepared as described above. The volumes of solution administered were varied to achieve doses of 15 to 2.5 mg. of papain per pound of live weight.

Injections were accomplised by means of a needle and graduated hypodermic syringe directly into the humeral vein. Injection times varied from ½ to 1 minute and the birds were dispatched 5 minutes after injection by severing the carotid artery. The birds were dressed, cleaned and then chilled for 24 hours before roasting. Tenderness panel ratings of the roasted chickens are reported below:

| Dose, mg. papain per lb. live weight | Tenderness Score | |
|---|---|---|
| | Group 1 | Group 2 |
| 15.0 | 9.3 | |
| 12.5 | 9.0 | 9.0 |
| 10.0 | 9.7 | 8.3 |
| 7.5 | 8.0 | 7.7 |
| 5.0 | 8.0 | 8.3 |
| 2.5 | | 7.3 |
| Control (none injected) | 3.7 | 4.0 |

The tenderness panel tests were based on a subjective rating by at least four persons. The rating values were as follows:

Excellent _____ 9 and 10
Good _____ 7 and 8
Fair _____ 5 and 6
Poor _____ 3 and 4
Repulsive _____ 1 and 2

Similar tests on roosters were conducted with trypsin, bromelin, and ficin. The results are summarized in the following tables:

Table I
TRYPSIN

| Dose, mg./lb. live weight | Average tenderness rating, dark meat |
|---|---|
| 60 | 10 |
| 45 | 9 |
| 30 | 7 |
| 15 | 4.5 |
| Control | 3.0 |

Table II
BROMELIN

| Dose, mg./lb. live weight | Average tenderness rating, dark meat |
|---|---|
| (No. 1): | |
| 60 | 6.2 |
| 45 | 7.0 |
| 30 | 8.5 |
| 15 | 6.5 |
| Control | 1.8 |
| (No. 2): | |
| 15 | 6.0 |
| 30 | 7.5 |
| Control | 6.6 |
| Control | 3.5 |

Table III
FICIN

| Dose, mg./lb. live weight | Average tenderness rating, dark meat |
|---|---|
| 15 | 9.3 |
| Control | 7.0 |
| Control | 5.0 |

EXAMPLE III

Papain in a physiological saline solution similar to that of Example I was injected into the jugular vein of a commercial grade cow in the amount of 15 mg. per pound of live weight of the cow. Five minutes after injection the cow was slaughtered. The carcass was dressed, and cuts thereof were cooked until done. These cooked cuts were submitted to a test panel and rated according to the procedure previously described.

| Cut | Average Tenderness rating |
|---|---|
| Steak | 7.0 |
| Chuck (dry roast) | 7.0 |
| Rib (dry roast) | 7.0 |

The tenderness score of these cuts without enzyme treatment would normally not exceed a value of 4.0.

Inspection of the livers of the animals tested revealed a tenderized but not over-digested organ. Veterinary inspection of the carcass and viscera from treated animals revealed no abnormalities which would indicate a questionable condition or necessity for condemnation of the carcass.

Obviously, many modifications and variations of the invention as hereinbefore set forth may be made without departing from the spirit and scope thereof, and therefore only such limitations should be imposed as are indicated in the appended claims.

We claim:

1. In a method to improve the tenderness of meat through enzymatic action the steps which comprise: introducing a proteolytic enzyme in liquid media into the vascular system of a living livestock animal in an amount equal to at least about 0.5 mg. of enzyme per pound of live weight of the animal, and slaughtering said animal within about 24 hours after completion of said enzyme introduction.

2. In a method to improve tenderness of meat through enzymatic action the steps which comprise: introducing a solution of proteolytic enzyme into the vascular system of a living animal in an amount equal to at least about 0.5 mg. of enzyme per pound of live weight of the animal, holding said animal for a short period of time to insure distribution of the enzyme throughout the animal body, slaughtering said animal within about 24 hours after completion of said enzyme introduction and draining the blood therefrom whereby the major portion of the enzymes in the larger arteries and veins is removed.

3. In a method to improve the tenderness of meat through enzymatic action, the steps which comprise: introducing a dilute solution of a proteolytic enzyme into the vascular system of a living animal in an amount equal to at least about 0.5 mg. of enzyme per pound of live weight of the animal and slaughtering said animal within about 30 minutes after completion of said enzyme introduction.

4. In a method to improve the tenderness of meat through enzymatic action the steps which comprise: introducing a proteolytic enzyme into the vascular system of a living livestock animal in an amount sufficient to tenderize and not in excess of approximately 60 mg. of enzyme per pound of live weight of the animal and slaughtering said animal within about 24 hours after completion of said enzyme introduction.

5. In a method to improve the tenderness of beef the steps which comprise: introducing a proteolytic enzyme into the vascular system of live cattle in an amount sufficient to tenderize and not in excess of approximately 60 mg. of enzyme per pound of live weight of said cattle, and slaughtering said cattle within about 24 hours after completion of said enzyme introduction.

6. In a method to improve tenderness of beef the steps which comprise: introducing a dilute aqueous solution of proteolytic enzyme of plant origin into the vascular system of live cattle in an amount equal to at least about 0.5 mg. of enzyme per pound of live weight of said cattle, holding said cattle for a period of time to insure essentially uniform distribution of said enzyme throughout the animal body, slaughtering said cattle within about 24 hours after introducing said enzyme, and draining the blood therefrom whereby the major portion of the enzyme in the larger arteries and veins is removed and the enzyme is distributed throughout the venules, capillaries and arterioles of the animal muscle.

7. In a method to improve the tenderness of beef by enzyme injection of living cattle the steps which comprise: immobilizing said cattle, injecting a physiological saline solution of proteolytic enzyme of plant origin into said cattle in an amount equal to at least about 0.5 mg. of enzyme per pound of live weight of said cattle and slaughtering said cattle within about 30 minutes after said enzyme injection.

8. In a process for producing tenderized meat products the steps for attaining substantially uniform distribution of proteolytic enzymes in animal tissue which comprise: introducing a proteolytic enzyme into the vascular system of a living livestock animal in an amount equal to at least about 0.5 mg. of enzyme per pound of live weight of the animal and slaughtering said animal within about 24 hours after introduction of said solution into said animal.

9. The method of claim 8 wherein the live animal is in the cattle classification.

10. The method of claim 8 wherein the enzyme is papain.

11. The method of claim 8 wherein the enzyme is bromelin.

12. The method of claim 8 wherein the enzyme is ficin.

13. In a method to improve the tenderness of meat through enzymatic action the steps which comprise: introducing a dilute aqueous solution of papain into the vascular system of an animal selected from the group consisting of cattle, sheep, and hogs, in an amount equal to at least about 0.5 mg. of papain per pound of live weight of the animal and slaughtering said animal within about 24 hours after introduction of said enzyme into the vascular system.

References Cited in the file of this patent

UNITED STATES PATENTS

| | | |
|---|---|---|
| 22,185 | Marsh | Nov. 30, 1858 |
| 2,043,392 | Paddock et al. | June 9, 1936 |
| 2,140,781 | Allen | Dec. 20, 1938 |
| 2,240,518 | Ramsbottom | May 6, 1941 |
| 2,321,623 | Ramsbottom et al. | June 15, 1943 |
| 2,351,614 | Hills et al. | June 20, 1944 |
| 2,471,282 | Paddock | May 24, 1949 |
| 2,786,768 | Deatherage | Mar. 26, 1957 |

FOREIGN PATENTS

| | | |
|---|---|---|
| 1,656 | Great Britain | of 1878 |